United States Patent
Girolamo et al.

(10) Patent No.: US 12,372,063 B2
(45) Date of Patent: Jul. 29, 2025

(54) ROTOR BLADE MONITORING SYSTEM

(71) Applicant: Siemens Gamesa Renewable Energy A/S, Brande (DK)

(72) Inventors: Donato Girolamo, Voorhout (NL); Esben Orlowitz, Grindsted (DK); Nevena Stevanovic, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 872 days.

(21) Appl. No.: 16/981,372

(22) PCT Filed: Feb. 15, 2019

(86) PCT No.: PCT/EP2019/053760
§ 371 (c)(1),
(2) Date: Sep. 16, 2020

(87) PCT Pub. No.: WO2019/179701
PCT Pub. Date: Sep. 26, 2019

(65) Prior Publication Data
US 2021/0071647 A1    Mar. 11, 2021

(30) Foreign Application Priority Data

Mar. 22, 2018 (EP) .................................. 18163345

(51) Int. Cl.
*F03D 17/00* (2016.01)
*G06K 9/20* (2006.01)
(Continued)

(52) U.S. Cl.
CPC ............. *F03D 17/00* (2016.05); *H04N 23/54* (2023.01); *F05B 2260/80* (2013.01); *F05B 2270/8041* (2013.01)

(58) Field of Classification Search
CPC ..... F03D 17/00; H04N 23/54; F05B 2260/80; F05B 2270/8041
(Continued)

(56) References Cited

U.S. PATENT DOCUMENTS 3,837,198 A * 9/1974 Higgins ............. G01B 11/2509
416/61
3,894,802 A * 7/1975 Higgins ............. G01B 11/2509
359/464

(Continued)

FOREIGN PATENT DOCUMENTS

CN      102032111 A    4/2011
CN      102046968 A    5/2011
(Continued)

OTHER PUBLICATIONS

Baqersad, Javad et al: "Dynamic characteristics of a wind turbine blade using 3D digital image correlation"; Jul. 14, 2014, available from http://proceedings.spiedigitallibrary.org/, Proc. of SPIE vol. 8348.

(Continued)

*Primary Examiner* — Kurt Philip Liethen
*Assistant Examiner* — John D Bailey
(74) *Attorney, Agent, or Firm* — Schmeiser, Olsen & Watts LLP (57) ABSTRACT

Provided is a rotor blade for a wind turbine, including: at least one camera mounted inside the rotor blade and adapted to acquire an image of a portion of an inner surface of the rotor blade.

15 Claims, 6 Drawing Sheets

(51) Int. Cl.
*G06K 9/46* (2006.01)
*H04N 5/225* (2006.01)
*H04N 23/54* (2023.01)

(58) Field of Classification Search
USPC .......................................................... 416/61
See application file for complete search history.

(56) References Cited

U.S. PATENT DOCUMENTS

| | | | |
|---|---|---|---|
| 5,104,216 A * | 4/1992 | Vokurka | G01C 11/06 356/611 |
| 5,135,308 A * | 8/1992 | Kuchel | G01B 11/2531 250/237 G |
| 8,218,135 B2 * | 7/2012 | Elie | G03B 35/00 356/139.1 |
| 9,035,231 B2 | 5/2015 | Zheng et al. | |
| 9,939,391 B1 * | 4/2018 | Hohman | G01N 29/221 |
| 10,008,027 B1 * | 6/2018 | Baker | G06T 7/593 |
| 10,466,359 B2 * | 11/2019 | Meir | G01S 7/4863 |
| 11,516,406 B2 * | 11/2022 | McCrackin | H04N 23/695 |
| 2010/0135788 A1 | 6/2010 | Qu | |
| 2010/0143129 A1 * | 6/2010 | Fisher | F03D 7/0256 416/61 |
| 2010/0289372 A1 | 11/2010 | Taniguchi et al. | |
| 2011/0103933 A1 | 5/2011 | Olesen et al. | |
| 2011/0267428 A1 * | 11/2011 | George | G01N 21/9515 348/46 |
| 2012/0217746 A1 | 8/2012 | Groendahl et al. | |
| 2013/0093879 A1 * | 4/2013 | Bertolotti | G01B 11/24 348/125 |
| 2013/0136594 A1 | 5/2013 | Casazza et al. | |
| 2014/0003942 A1 * | 1/2014 | Bertolotti | F03D 80/55 416/61 |
| 2014/0168420 A1 * | 6/2014 | Naderhirn | G01M 5/0091 348/128 |
| 2014/0271181 A1 * | 9/2014 | Perley | F03D 7/04 416/61 |
| 2016/0040655 A1 * | 2/2016 | Kötting | F03D 80/88 416/61 |
| 2016/0055400 A1 * | 2/2016 | Jorquera | F03D 17/00 416/61 |
| 2016/0063350 A1 * | 3/2016 | Newman | G06T 7/62 348/125 |
| 2017/0271937 A1 | 9/2017 | Takei | |
| 2018/0003159 A1 * | 1/2018 | Bunge | G06T 7/0004 |
| 2018/0150047 A1 * | 5/2018 | Shapiro | G05B 19/19 |
| 2018/0180412 A1 * | 6/2018 | de Groot | G06T 7/49 |
| 2018/0205935 A1 * | 7/2018 | Burakou | G05B 19/401 |
| 2018/0338126 A1 * | 11/2018 | Trevor | H04N 23/698 |
| 2018/0343385 A1 * | 11/2018 | Mimura | H04N 23/65 |
| 2019/0385326 A1 * | 12/2019 | Baqersad | G06T 3/4038 |
| 2020/0098122 A1 * | 3/2020 | Dal Mutto | H04N 23/60 |
| 2021/0363975 A1 * | 11/2021 | Hoffmann | F03D 80/30 |
| 2022/0003212 A1 * | 1/2022 | Li | H04N 7/18 |
| 2022/0237766 A1 * | 7/2022 | Jiang | G06T 7/33 |

FOREIGN PATENT DOCUMENTS

| | | |
|---|---|---|
| CN | 102808722 A | 12/2012 |
| CN | 204140276 U | 2/2015 |
| DE | 102008037096 A1 | 2/2010 |
| DE | 102009022179 A1 | 11/2010 |
| DE | 102011016868 A1 | 10/2011 |
| DE | 102010055500 A1 | 6/2012 |
| DE | 202015008938 U1 | 4/2016 |
| EP | 1940007 A1 | 7/2008 |
| EP | 2492501 A1 | 8/2012 |
| EP | 2511522 A1 | 10/2012 |
| EP | 2511524 A1 | 10/2012 |
| GB | 2465790 A | 6/2010 |
| WO | 2009143849 A2 | 12/2009 |
| WO | 2010061290 A2 | 6/2010 |
| WO | 2014106843 A2 | 7/2014 |
| WO | 2016033181 A1 | 3/2016 |

OTHER PUBLICATIONS

International Search Report and Written Opinion of the International Searching Authority issued Mar. 27, 2019 for Application No. PCT/EP2019/053760.
European Search Report and Written Opinion of the European Searching Authority issued Oct. 2, 2018 for Application No. 18163345.4.
Jianqiu Sun et al; "New York Institute of Photography"; published 1986.

* cited by examiner

ROTOR BLADE MONITORING SYSTEM

CROSS-REFERENCE TO RELATED APPLICATIONS

This application claims priority to PCT Application No. PCT/EP2019/053760, having a filing date of Feb. 15, 2019, which is based off of EP Application No. 18163345.4, having a filing date of Mar. 22, 2018, the entire contents both of which are hereby incorporated by reference.

FIELD OF TECHNOLOGY

The following relates to a rotor blade for a wind turbine, a rotor blade monitoring system, a wind turbine and further to a method of monitoring a structural state of a rotor blade of a wind turbine.

BACKGROUND

A wind turbine may comprise a rotation shaft with a hub at which plural rotor blades are mounted. The rotation shaft may mechanically be coupled with a rotor of a generator to generate electric energy upon rotation of the hub to which the rotor blades are connected. The rotor blades may be subject to wear during operation such that they deteriorate over prolonged operation time.

Therefore, monitoring the structural state or structural integrity of the rotor blades is necessary. Monitoring of the structural health of the wind turbine blades may conventionally require regular in-situ inspection, in order to avoid critical failure modes of the blades structure. In-situ inspection of blades on wind turbines however is currently costly and time-consuming. Furthermore, it may be weather-dependent and often the wind turbines are situated in hard-to-access sites in remote areas or offshore installations, making it difficult to plan and perform inspections. Additionally, the rotor blades nowadays are relatively large and expensive components of wind turbines. Thus, a lengthy structural repair involving stopped energy production or blade loss due to structural damage may involve major disadvantages.

Conventional visual in-situ inspection is performed by maintenance personnel on a yearly or biyearly basis for all wind turbines of a wind park. Thereby, maintenance personnel enter the blades, inspects the surfaces and takes pictures if suspicious observations are found. This monitoring operation can be done only one blade at a time because the blade under inspection needs to be horizontal which again may put requirements on the weather condition. The decision if damage is present is subjectively judged by a person and the end result will depend on that person's knowhow and experience.

Thus, there may be a need for a rotor blade for a wind turbine, for a rotor blade monitoring system, for a wind turbine and further for a method of monitoring a structural state of a rotor blade of a wind turbine, wherein monitoring can be performed in a simplified manner and in a reliable manner, in particular without requiring that maintenance personnel is present.

SUMMARY

According to an embodiment of the present invention it is provided a rotor blade for a wind turbine, comprising: at least one camera mounted inside the rotor blade and adapted to acquire an image of a portion of an inner surface of the rotor blade.

The camera may be adapted to acquire one or more two-dimensional images of the portion of the inner surface of the rotor blade. Therefore, the camera may comprise plural light-sensitive elements for example arranged in a two-dimensional array. The light-sensitive elements may for example comprise a CCD or a CMOS unit. The camera(s) may also comprises one or more optical filters that filter out one or more spectral ranges, such as a visible range, infrared light range, ultraviolet range, and thereby allow to form the images by acquiring intensities of selected wavelength range (s). Further one or more lenses or in general an objective may be arranged in front of the light sensitive elements, allowing focussing. The camera may be permanently mounted inside the rotor blade such that the camera is also mounted within the rotor blade while the wind turbine is in normal operation, thus producing electric energy upon rotation of the rotor blades. Depending on the extent of the rotor blade and the viewing ranges (e.g. angles) of the camera, plural cameras may be mounted inside the rotor blade and mounted at different positions such that they are enabled to essentially acquire images of the entire inner surface of the rotor blade. Thereby, it may be avoided that maintenance personnel enters inside the rotor blade and manually takes pictures of critical regions of the inner surface.

The rotor blade may have an (internal) hollow space with at least one shear web. The shear web (or web) may be an internal structural subcomponent of the rotor blade. It connects the spar caps present at the pressure and suction sides and may have the function of transferring the shear loads that are present in the blade due to the flapwise bending moment applied to the structure. It may consist of or comprise a composite sandwich plate having plywood core and glass fiber reinforced plastic (GFRP) facesheets.

The camera may be mounted directly or indirectly at a mounting portion of the inner surface, for example by gluing a mounting face of the camera or a mounting face of a frame at which the camera is mounted to the mounting portion of the inner surface. The camera may also be bolted to the inside of the rotor blade or may be mounted by other means. Thereby, simple monitoring of the structural state of the blade may be enabled.

According to an embodiment of the present invention, the rotor blade further comprises at least one light source mounted inside the rotor blade, adapted to generate illumination light and arranged to illuminate the portion of the inner surface.

Other embodiments of the present invention may not require a light source, since light from the environment may enter the inside of the rotor blade, for example in cases where the rotor blade wall is at least partly transparent. However, to more accurately control the brightness, the light source may be advantageous to accurately adjust brightness of the illuminated portion of the inner surface and/or adjust an image acquisition time of the camera to acquire at least one image. Using for example a control module or the like, the at least one light source may be controllable regarding switching on and off the light source and/or also regarding adjusting the brightness of the light source or the intensity of the light source. For example, a control module may be adapted to control the light source to switch the light source on only if acquiring at least one image is desired for monitoring the rotor blade. For example, at least one image may be taken on a regular time basis, such as daily, every two days, every week, three times a month or yearly, for example. During these periods of image acquisitions, the light source may be controlled to be switched on. The illumination light may comprise at least visible light (for example from about 300 nm to about 800 nm) and/or may at least comprise one or more wavelength ranges within the visible light spectrum. Further, the illumination light may comprise or may not comprise infrared light (or at least some wavelength range of the infrared spectrum) and/or ultraviolet light or ultraviolet wavelength ranges. Having an appropriate illumination by the light source may improve the image quality.

According to an embodiment of the present invention, the at least one camera and/or the at least one light source is mounted at a mounting portion of the inner surface, wherein the at least one camera and/or the at least one light source is in particular mounted using an adhesive.

The inner surface may be a surface of a rotor blade wall providing at the outside an airfoil at which the wind impacts. The airfoil is shaped to cause the rotor blade to exert a momentum to the rotation shaft in order to effect a rotation of the rotation shaft. When the camera and/or the light source is mounted at a mounting portion of the inner surface, no particular provision of a particular mounting arrangement may be necessary, but the camera and/or the light source may be plainly mounted at the inner surface which is unmodified compared to a conventional inner surface of a rotor blade.

When an adhesive is used, the shape of the outer surface (in particular forming an airfoil) of the rotor blade may not be altered or effected. Thereby, the aerodynamic property of the rotor blade may be unchanged. The adhesive may for example be or comprise a polymer resin which has been hardened, thereby forming a cross-linked polymer. Also, the rotor blade wall (having the inner surface and the outer airfoil) may be manufactured from a polymer which has been cross-linked. Other manufacturing materials and methods are possible. Thereby, mounting the camera and/or the light source at conventionally utilized rotor blade materials may be enabled.

According to an embodiment of the present invention, the at least one camera and/or the at least one light source is mounted on at least one frame that is mounted on the inner surface. The frame may enable to properly adjust the orientation of the camera and/or the light source such that the light source illuminates a region of the inner surface which is also in the viewing range of the camera. Further, the frame may enable to properly adjust the orientation and positioning of the camera and/or the light source such that the camera does not shadow the illumination light, is not in the illumination light path. The frame may have mounted thereon one camera, two cameras, three cameras or even more cameras and one light source, two light sources, three light sources or even more light sources.

According to an embodiment of the present invention, the frame has a mounting surface which is fit, in particular complementary, to a shape of the mounting portion of the inner surface. When the mounting surface of the frame is complementary to the shape of the mounting portion of the inner surface, the mounting surface may in a simple manner be glued to the mounting portion of the inner surface, thereby simplifying mounting the frame to the inside of the rotor blade. Providing the frame may allow to utilize conventionally available cameras and light sources without requiring the cameras and the light sources to have particularly shaped mounting surfaces, since the frame may serve as an adaptor. Thereby, costs may be reduced. The frame may be made of any material, such as a polymer, a metal, wood, any plastic, any thermosetting material, or the like. In particular, differently shaped frames regarding their mounting surface may be utilized having respective mounting surfaces which are complementary to different mounting portions of the inner surface, for example along the longitudinal direction of the rotor blade.

According to an embodiment of the present invention, the at least one camera comprises plural cameras mounted inside the rotor blade and adapted to acquire plural images of plural, in particular partly overlapping, portions of the inner surface of the rotor blade, and/or wherein the light source comprises plural light sources mounted inside the rotor blade and arranged to illuminate the plural portions of the inner surface.

Having plural cameras and/or plural light sources may enable to essentially monitor the entire inner surface of the rotor blade.

In other embodiments the at least one camera comprises exactly one camera, in particular having large viewing angle covering 180°.

According to an embodiment of the present invention, at least one image acquisition unit is formed by an assembly of at least one camera, in particular three cameras, at least one light source all mounted on one frame, wherein the rotor blade in particular comprises plural image acquisition units, further in particular arranged in sets of image acquisition units mounted to face each other.

Providing at least one image acquisition unit may simplify the construction and reduce costs. Inside the rotor blade, one image acquisition unit may be mounted on for example a back side of a luv outer surface of the rotor blade and another image acquisition unit may be oppositely mounted inside the rotor blade at a back side of a lee outer surface of the rotor blade. Thereby, a set of acquisition units is formed. Several sets of image acquisition units may be mounted inside the rotor blade for example spaced apart along a longitudinal direction of the rotor blade.

According to an embodiment of the present invention, cameras on one image acquisition unit: are oriented to have viewing directions differing by at least 20°, in particular by between 25° and 70°, further in particular by between 35° and 40°, and/or mounted close to each other such as to enable acquiring images from the entire surface of interest.

In particular, on one image acquisition unit, three or e.g. six cameras may be provided having the different viewing directions. The three cameras may simultaneously or successively acquire respective images and the images may be stitched together resulting in a combination image comprising information of essentially 180° or an entire back side of a lee outer side or luv outer side of the rotor blade. In other embodiments, only one camera may be present in an image acquisition unit having a viewing angle of between 170° and 180° for example.

According to an embodiment of the present invention, the mounting portion of the inner surface is a back surface of an airfoil portion of the blade. The airfoil portion may be a portion of a lee side or a luv side of the rotor blade.

According to an embodiment of the present invention, the plural portions of the inner surface essentially cover an entire longitudinal extent of the blade. Thereby, a thorough monitoring of the rotor blade may be enabled.

According to an embodiment of the present invention, the at least one camera is sensitive to at least a portion of visual light and/or to at least a portion of infrared light and/or to at least a portion of ultraviolet light.

Also, the light source may be adapted to generate visible light and/or may be adapted to generate at least a portion of ultraviolet light and/or a portion of infrared light. Depending on the kind of damage to be identified, using different wavelength ranges may be advantageous.

According to an embodiment of the present invention, the rotor blade further comprises a wireless or wire based communication interface for communicating control signals and/or image data between the at least one camera and/or the at least one light source and a control module outside the rotor blade. Further, electrical energy may be supplied to the blade monitoring system from outside the rotor blade.

For example, using control signals from an external (or internal) control module, the camera and/or the light source may be controlled to be switched on or off or may be configured regarding generated light intensity or brightness or regarding image acquisition time, focusing, applying filters or the like. The camera (or a processing module within the rotor blade) may be enabled to perform some pre-processing, for example performing averaging, filtering, feature extraction or the like. The wire-based communication interface may be adapted for an electrical wire and/or an optical wire.

According to an embodiment it is provided a rotor blade monitoring system, comprising: a rotor blade according to any of the preceding embodiments; and an analysis module comprising image processing capability to process the image to recognize features in the image indicating damage of the inner surface.

The analysis module may have access to a library of reference images which may be compared to the images acquired by the camera within or inside the rotor blade, in order to detect faults or damage. Any electronics (e.g. comprised in the analysis module) may be encloses in a proper casing for protection of the electronics, the cases e.g. providing a particular IP rating.

According to an embodiment of the present invention it is provided a wind turbine comprising: a rotation shaft; and a rotor blade according to any of the preceding embodiments or a rotor blade monitoring system according to the preceding embodiment, wherein the rotor blade is mounted at the rotation shaft.

It should be understood, that features, individually or in any combination, disclosed, described or explained in the context of a rotor blade or a rotor blade monitoring system or a wind turbine may also be applied, individually or in any combination, to a method of monitoring a structural state of a rotor blade of a wind turbine and vice versa according to embodiments of the present invention.

According to an embodiment of the present invention it is provided a method of monitoring a structural state of a rotor blade of a wind turbine, the method comprising: using at least one camera mounted inside the rotor blade to acquire at least one image of a portion of an inner surface of the rotor blade; and analysing the image to determine the structural state of the rotor blade.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

The illustration in the drawings is in schematic form. It is noted that in different figures, similar or identical elements are provided with the same reference signs or with reference signs, which are different from the corresponding reference signs only within the first digit.

According to an embodiment of the present invention, multiple, permanent mounted camera sensors are regularly (e.g. at regular time intervals) taking pictures covering the full internal surface of the rotor blade from the root start to the end of the web start. The camera sensors may be collected in units together with a light source, for example as is illustrated in a schematic form in FIG. 1.

Figure 1:
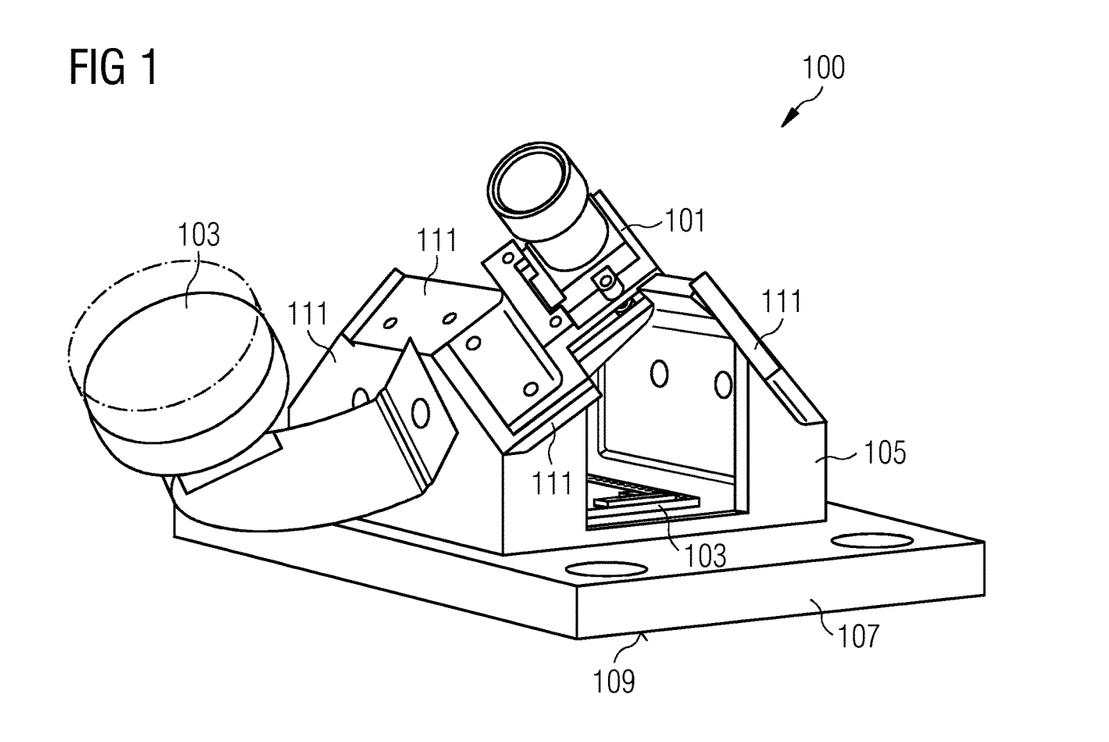
FIG. 1 schematically illustrates an image acquisition unit which may be installed in a rotor blade according to an embodiment of the present invention.

Thereby, FIG. 1 illustrates an image acquisition unit 100 that may be installed inside a rotor blade according to an embodiment of the present invention. Thereby, the image acquisition unit 100 comprises an assembly of at least one camera 101, at least one light source 103 and a mounting frame 105 at which the camera 101 and the light source 103 are mounted.

Furthermore, the mounting frame or frame 105 comprises a mounting plate 107 having a mounting surface 109 which may directly be attached, for example by gluing, to an inner surface of a rotor blade.

The image acquisition unit 100 may comprise more than one camera 101, such as two cameras, three cameras or even more cameras which may be oriented to direct their respective viewing ranges in different angle ranges. The camera 101 may comprise an imaging optics (optionally including spectral filter(s)) and an array of light-sensitive elements, such as a two-dimensional CCD array or CMOS array, for example.

The mounting frame 105 comprises component mounting areas 111 comprising threaded holes at which components, such as the camera 101 and the light source 103, may be bolted. The mounting plate 107 may be made of wood, a thermosetting material, a polymer, metal or the like. The mounting surface 109 may be shaped complementary to a shape of an inner surface or a portion of an inner surface of the rotor blade. The image acquisition assembly 100 further comprises a control board and/or communication interface 113 which may perform to control the camera 101 and/or the light source and which may also perform some processing of data, such as image data acquired by the camera 101.

Figure 2:
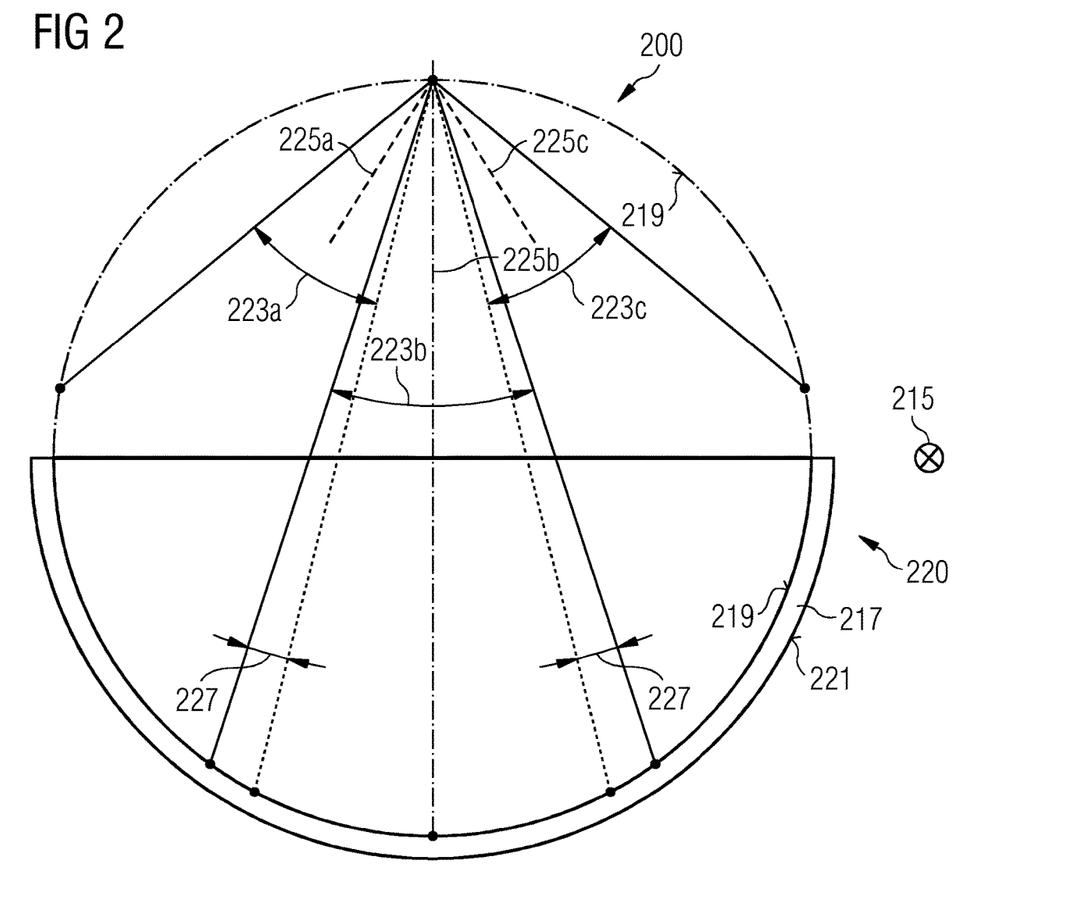
FIG. 2 schematically illustrates viewing angles of cameras of an image acquisition unit as configured according to an embodiment of the present invention.

A single image acquisition unit with multiple sensors or cameras may cover different angles and may ensure that at least or more than 180° will be covered. An illustration of the viewing ranges of three cameras is schematically illustrated in FIG. 2 in a cross-section as viewed along a longitudinal direction 215 of the rotor blade. Therein, (a portion of) the rotor blade wall 217 is schematically illustrated having an inner surface 219 and an outer surface 221 which may be an airfoil of the rotor blade 220. The image acquisition unit 200 is mounted at a portion of the inner surface 219 of the rotor blade and comprises in the illustrated example three cameras having three overlapping viewing ranges 223a, 223b, 223c. The viewing ranges 223a,b,c are in the illuminated example each 36°. As can be taken from FIG. 2, the three cameras are oriented to have viewing directions 225a, 225b, 225c differing by 32°. Since their viewing angle is 36° each, images acquired by the three cameras will overlap in an angle range of 4°, wherein the overlap is indicated with reference sign 227. In other embodiments a combined viewing range may cover 180°.

Figure 3:
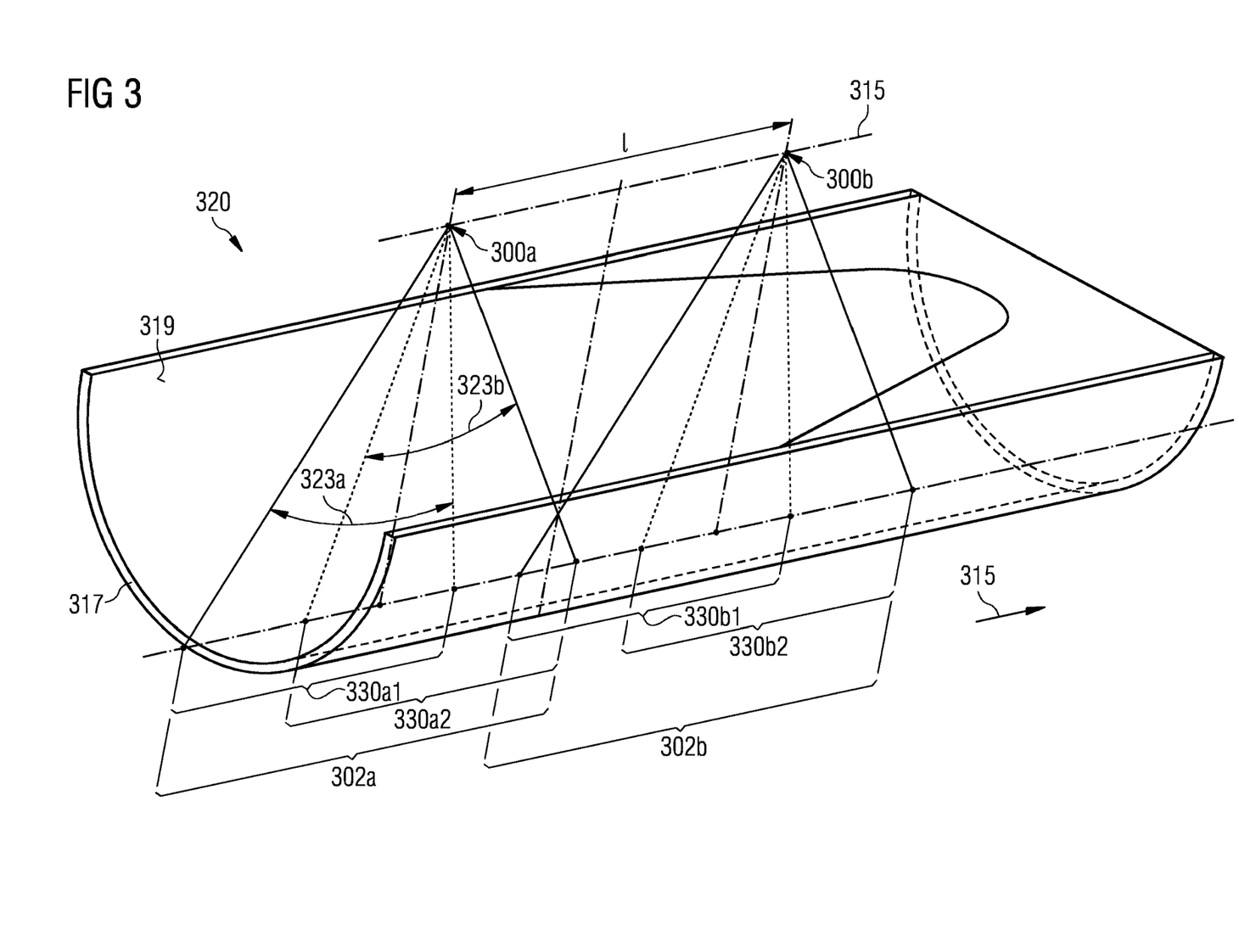
FIG. 3 schematically illustrates in a perspective view an arrangement of two image acquisition units within a rotor blade according to an embodiment of the present invention.

FIG. 3 schematically illustrates in a perspective view a portion of a rotor blade 320 according to an embodiment of the present invention having installed therein two acquisition units 300a and 300b each comprising three cameras and one or more light sources. The rotor blade is schematically illustrated in a partly broken away form as having a rotor blade wall 317 having an inner surface 319 and having an outer surface 321. Each of the two cameras installed in the image acquisition unit 300a has in the illustrated example a viewing range of 49.2°. The two cameras are oriented such that an overlap of 30° is achieved.

According to an embodiment of the present invention the monitoring system may comprises an image-sensor (e.g. including a lens/objective) that covers the 180°. In principle this could be done with a single image sensor (having e.g. a lens) but the quality may be too poor. When more image sensors (e.g. with lenses) are used to cover the 180° it is important that there exist an overlap (margin) between viewing ranges of the individual image sensors.

The second image acquisition unit 300b has its two or three cameras oriented such that their viewing area 302b (composed of viewing areas 330b1, 330b2 of the two cameras) partly overlaps with the viewing area 302a (composed of viewing areas 330a1, 330a2 of the two cameras) of the first image acquisition unit 300a. According to an embodiment of the present invention, within the viewing areas 302a, 302b, further image acquisition units may be installed which may then monitor the opposite side, thus, the inner surface where the image acquisition units 300a and 300b are mounted.

Figure 4:
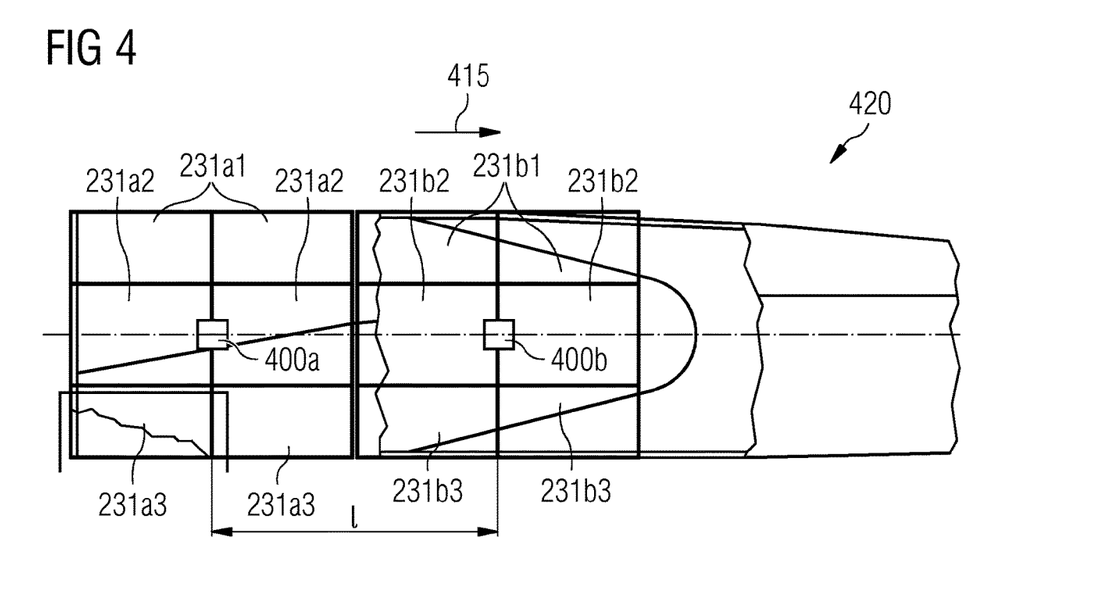
FIG. 4 schematically illustrates an elevational view in which the longitudinal direction of the rotor blade is in the horizontal direction.

FIG. 4 schematically illustrates an elevational view in which the longitudinal direction 415 of the rotor blade is in the horizontal direction. A first image acquisition unit 400a and a second image acquisition unit 400b are installed inside the rotor blade spaced apart by a distance 1 in the longitudinal direction 415. Each of the image acquisition units 400a, 400b comprises three cameras, a first one having the viewing range 231a1, another one having the viewing range 231a2 and the third one having the viewing range 231a3. The first camera of the second image acquisition unit 400b has a viewing range 231b1, a second camera has a viewing range 231b2 and a third has a viewing range 231b3. Thereby, the union of all viewing ranges 231a1 to 231b3 covers substantially entirely the inner surface of one side of the rotor blade.

Figure 5:
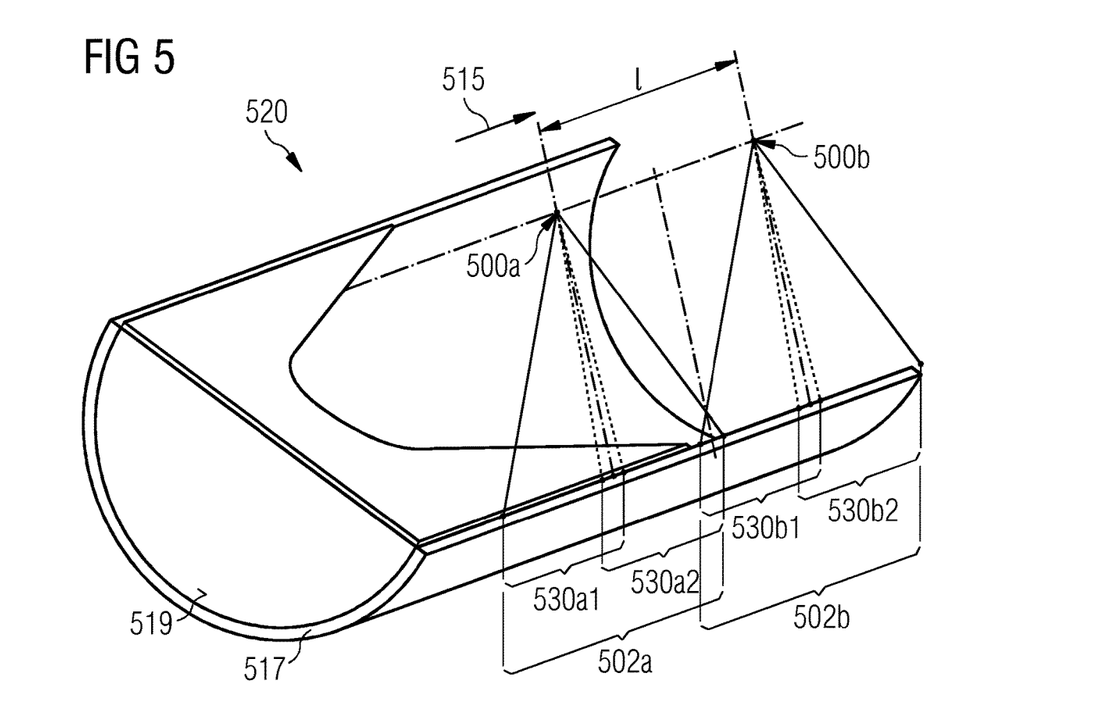
FIG. 5 schematically illustrates in a perspective view another rotor blade 520 according to an embodiment of the present invention having image acquisition units.

FIG. 5 schematically illustrates in a perspective view another rotor blade 520 according to an embodiment of the present invention having image acquisition units 500a, 500b arranged inside the rotor blade at different positions spaced apart along the longitudinal direction 515. Thereby, each of the image acquisition units 500a, 500b comprises two cameras having different viewing ranges 530a1, 530a2 for the first image acquisition unit 500a. Further, the two cameras of the second image acquisition unit 500b have the viewing ranges 530b1 and 530b2 overlapping by several degrees.

Figure 6:
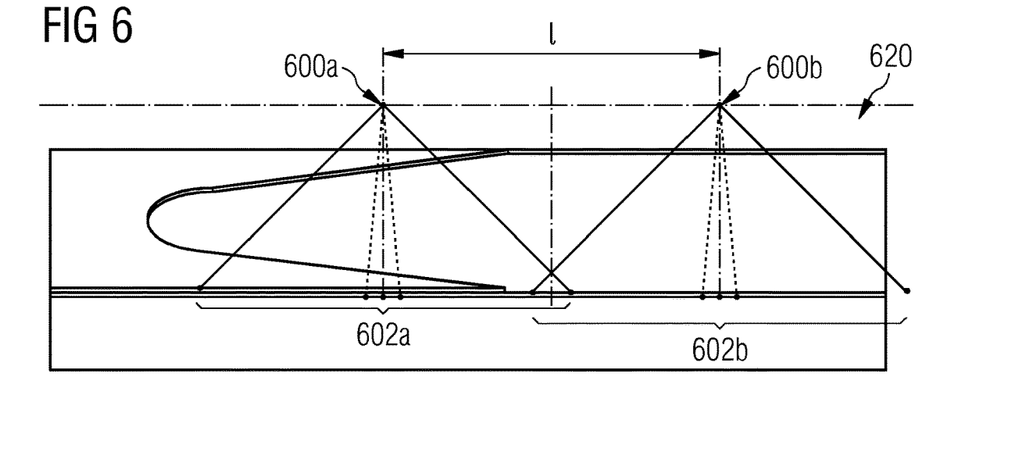
FIG. 6 schematically illustrates further arrangements of image acquisition units within a rotor blade according to embodiments of the present invention.

FIG. 6 schematically illustrates a rotor blade 620 according to another embodiment of the present invention having several image acquisition units 600a, 600b installed within the rotor blade and having two cameras each monitoring overlapping viewing ranges.

Figure 7:
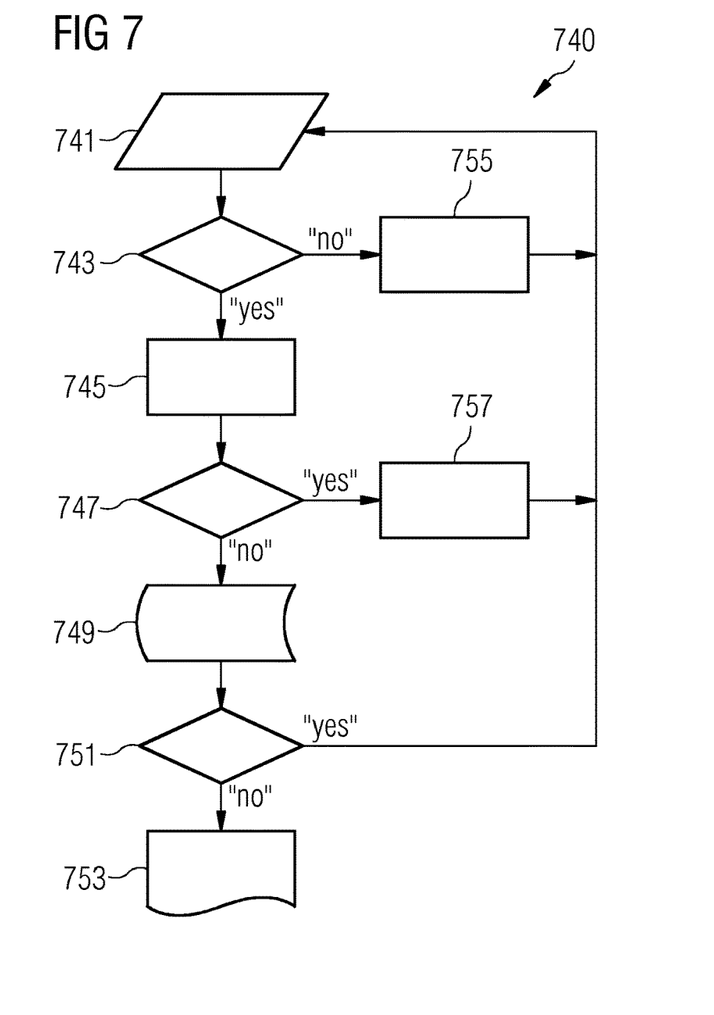
FIG. 7 illustrates a method scheme of a method for monitoring a rotor blade according to an embodiment of the present invention.

FIG. 7 schematically illustrates a method diagram of a method 740 of monitoring a structural state of a rotor blade of a wind turbine according to an embodiment of the present invention. Thereby, the method uses at least one camera mounted inside the rotor blade to acquire at least one image of a portion of an inner surface of the rotor blade. Further, the image is analysed to determine the structural state of the rotor blade.

According to the embodiment illustrated in FIG. 7 in a method step 741, pictures are captured for example at a daily basis. In a decision block 743 it is checked whether the operation was acceptable, and the image quality is sufficient. If the decision block 743 results in "yes" it is proceeded to the method step 745 where feature extraction and/or data processing is performed. In a decision block 747 it is checked whether the data processing resulted in a value which is smaller or larger than a threshold. If the value is not smaller than the threshold, it is proceeded to method block 749 where a counter is increased which counts the number of warnings. In a decision block 751 it is checked whether the number of warnings is smaller than a threshold. If this is not the case, it is proceeded to method step 753, wherein an alarm is raised.

If the number of warnings is smaller than the threshold, it is recycled back to the first method step 741.

If the decision block 743 found that the operation and quality is not acceptable, it is proceeded to method block 755 where no actions are performed, and it is cycled back to the first method step 741.

If the decision block 747 found that the value is smaller than the threshold, it is proceeded to the method step 757 where no further actions are taken, and it is cycled back to the first method step 741.

As can be taken from FIG. 2, the three cameras cover a range of 180°, i.e. one side of an inner surface of the rotor blade. The remaining 180° may be covered by a similar acquisition unit sitting on the opposite side of the internal surface. Together two units sitting opposite to each other may be referred to a set of image acquisition units. For covering the full length of interest of the blade, sets of image acquisition units may be placed along the blade, such as is illustrated in FIG. 3.

According to embodiments of the present invention, the images or pictures which have been acquired by the different cameras may be transferred to a diagnostic center or control module or processing module where they may be analyzed in an automated manner for damages of the blade. If damages are recognized, an alarm may be raised, as is indicated in method step 753 in FIG. 7. The analysis may involve feature extraction and may be based on image processing, especially image segmentation, for example background subtraction. The images may be compared to known healthy (base line) images or reference images of the internal rotor blades and an alarm may be raised if a threshold is reached, such as the difference of acquired image and reference image shows a pronounced image feature. The diagnostic center could be in-situ at the turbine level (real-time/online) or on a remote server (offline). The method illustrated in FIG. 7 may be applied to all rotor blades of the wind turbine, for example three rotor blades.

Embodiments of the present invention may provide several advantages:

Pictures of the internal surface of the rotor blade may be acquired remotely. This may be an extensive cost reduction as the same operation requires at least two trained maintenance personnel and transportation to sites on a regular basis.

The option of making an automated analysis of the pictures and activating alarms when a potential damage is discovered Automated procedures using image processing may be objective in their detection and such that the detection of the damages does not depend on the specialists know-how and experience Rotor blades according to embodiments of the present invention may comprise permanently internally mounted units, containing multiple camera units and at least one light source. Identical pictures on a regular basis may be taken, thereby the same viewing angles and light conditions may be applied. Embodiments of the present invention may allow a higher likelihood of discovering damages on an early stage, giving lower repair cost and reduction of the risk of a fatal failure.

Figure 8:
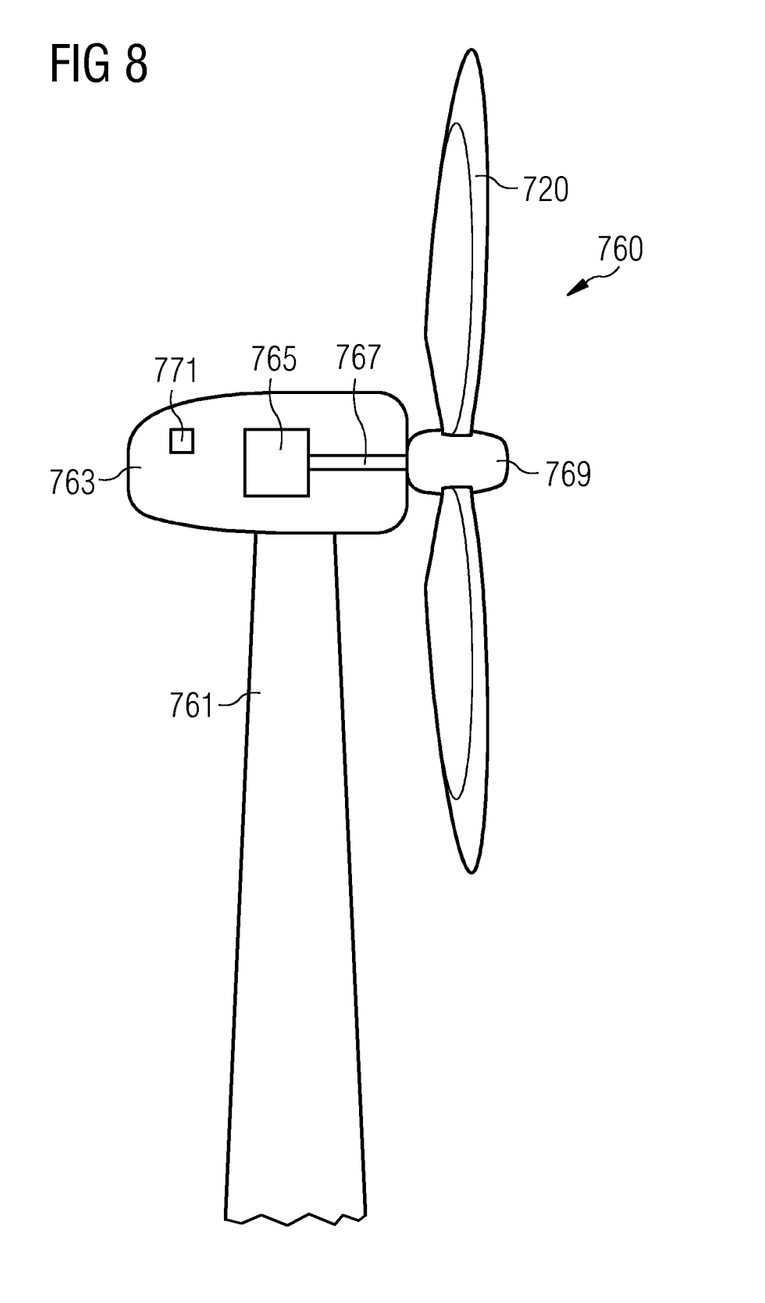
FIG. 8 schematically illustrates a wind turbine according to an embodiment of the present invention.

FIG. 8 schematically illustrates a wind turbine 760 according to an embodiment of the present invention. The wind turbine comprises a wind turbine tower 761 at which a nacelle 763 is mounted. The nacelle harbours a generator 765 having a rotation shaft 767 which is coupled to a hub 769 at which plural rotor blades 720 are mounted, such as rotor blades illustrated in one of FIGS. 2, 3, 4, 5, 6. An analysis module 771 is arranged within the nacelle 763 and comprises image processing capability to process the image taken by the camera within the rotor blade 720 to recognize features in the image indicating damage of the inner surface of the rotor blade 720.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor blade for a wind turbine, comprising:
a plurality of cameras mounted to an inner surface of the rotor blade, wherein the plurality of cameras are arranged inside the rotor blade;
wherein the plurality of cameras includes a first camera and a second camera, wherein the first camera is configured to acquire a first image of a first portion of the inner surface of the rotor blade, wherein the second camera is configured to capture a second image of a second portion of the inner surface of the rotor blade;
at least one light source mounted inside the rotor blade, wherein the at least one light source is configured to generate illumination light and is arranged to illuminate the first portion of the inner surface of the rotor blade and/or the second portion of the inner surface of the rotor blade;
at least one frame, wherein the first camera and the at least one light source are mounted on the at least one frame that is mounted on the inner surface of the rotor blade;
wherein the at least one frame has a mounting surface fit to a shape of a mounting portion of the inner surface;
wherein the mounting surface of the at least one frame is fit complementary to the shape of the mounting portion of the inner surface;
wherein the mounting portion of the inner surface is a back surface of an airfoil portion of the rotor blade.

2. A rotor blade monitoring system, comprising:
the rotor blade according to claim 1; and
an analysis module comprising image processing capability to process the first image and/or the second image to recognize features indicating damage of the inner surface of the rotor blade.

3. A wind turbine comprising:
a rotation shaft; and
the rotor blade or the rotor blade monitoring system according to claim 2,
wherein the rotor blade is mounted at the rotation shaft.

4. The rotor blade according to claim 1, wherein the first camera, the second camera, and/or the at least one light source is mounted at the mounting portion of the inner surface of the rotor blade using an adhesive.

5. The rotor blade according to claim 1, wherein the at least one light source is a plurality of light sources mounted inside the rotor blade and arranged to illuminate the first portion of the inner surface of the rotor blade and the second portion of the inner surface of the rotor blade.

6. The rotor blade according to claim 1, wherein at least one image acquisition unit is formed by an assembly of the first camera, the second camera, and the at least one light source all mounted on at least one mounting frame inside the rotor blade, wherein the at least one image acquisition unit is a plurality of image acquisition units, wherein the plurality of image acquisition units are arranged in sets facing each other.

7. The rotor blade according to claim 1, wherein the first camera and the second camera are mounted on at least one image acquisition unit, wherein the viewing direction of the first camera and the second camera differ are oriented to have viewing directions differing by at least 20°, by between 25° and 70°, by between 35° and 40°, and/or mounted close to each other.

8. The rotor blade according to claim 1, wherein the first portion of the inner surface of the rotor blade and the second portion of the inner surface of the rotor blade cover a longitudinal extent of the rotor blade.

9. The rotor blade according to claim 1, wherein at least one of the first camera and the second camera is sensitive to at least a portion of visual light and/or to at least a portion of infrared light and/or to at least a portion of ultraviolet light.

10. The rotor blade according to claim 1, further comprising:
a wireless or wire based communication interface for communicating control signals and/or image data between the first camera, the second camera, and/or the at least one light source and a control module outside the rotor blade.

11. The rotor blade according to claim 1, wherein a viewing direction of the first camera or the second camera is perpendicular to a longitudinal axis of the rotor blade.

12. The rotor blade according to claim 1, wherein the first camera and the first portion are located at a same position along a longitudinal axis of the rotor blade, inside the rotor blade, and the second camera and the second portion are located at a same position along the longitudinal axis of the rotor blade, inside the rotor blade.

13. The rotor blade according to claim 1, wherein all viewing directions of the first camera and the second camera intersect with a longitudinal axis of the rotor blade.

14. The rotor blade according to claim 1, wherein the first camera is mounted over and faces the first portion and the second camera is mounted over and faces the second portion.

15. A method of monitoring a structural state of a rotor blade of a wind turbine, the method comprising:

providing a first camera mounted to an inner surface of the rotor blade and a second camera mounted to the inner surface of the rotor blade, wherein the first camera and the second camera are arranged inside the rotor blade, at least one light source mounted inside the rotor blade, wherein the at least one light source is configured to generate illumination light and is arranged to illuminate the first portion of the inner surface of the rotor blade and/or the second portion of the inner surface of the rotor blade, and at least one frame, wherein the first camera and the at least one light source are mounted on the at least one frame that is mounted on the inner surface of the rotor blade, wherein the at least one frame has a mounting surface fit to a shape of a mounting portion of the inner surface, wherein the mounting surface of the at least one frame is fit complementary to the shape of the mounting portion of the inner surface, wherein the mounting portion of the inner surface is a back surface of an airfoil portion of the rotor blade;

acquiring a first image of a first portion of the inner surface of the rotor blade and a second image of a second portion of the inner surface of the rotor blade; and analysing the first image and/or the second image to determine a structural state of the rotor blade.

* * * * *